Aug. 7, 1956  C. J. WITTEN  2,757,524
LIQUID AND FOOD HOLDER UNIT
Filed Sept. 12, 1952
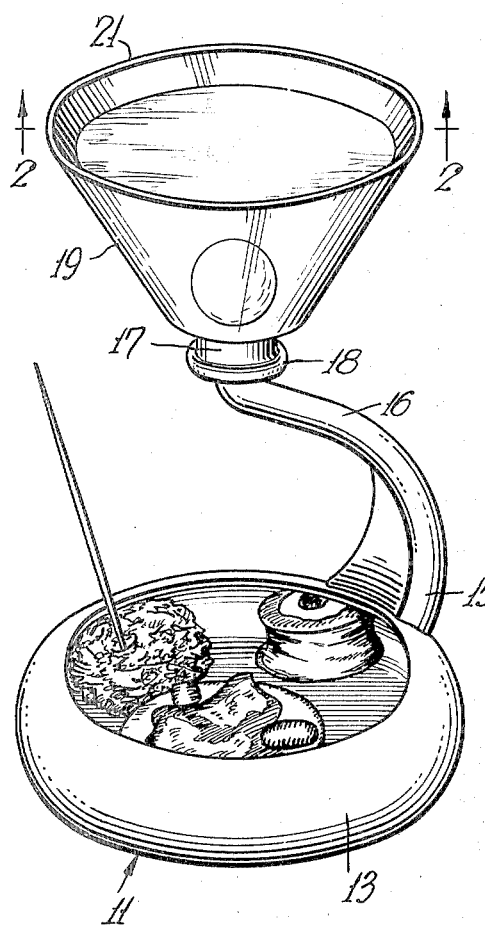
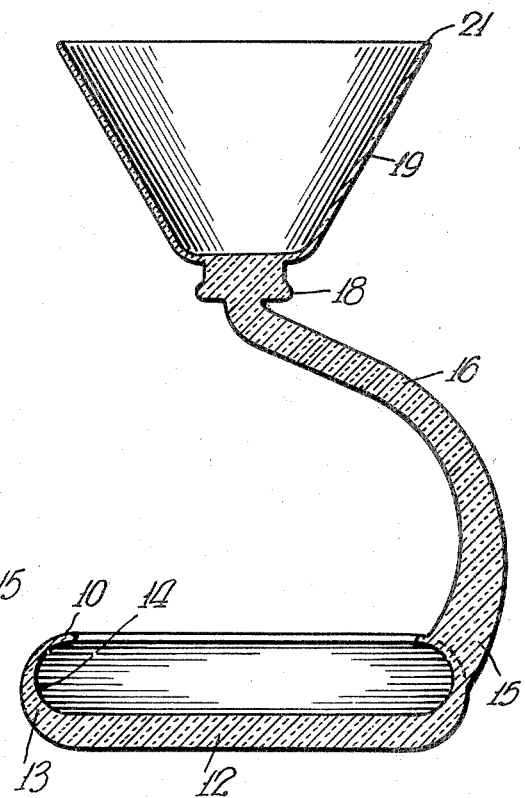
INVENTOR
Constance J. Witten
BY
Dean Fairbank & Hirsch
ATTORNEYS

United States Patent Office 2,757,524
Patented Aug. 7, 1956

2,757,524

LIQUID AND FOOD HOLDER UNIT

Constance J. Witten, Bay Shore, N. Y.

Application September 12, 1952, Serial No. 309,178

1 Claim. (Cl. 65—13)

It is among the objects of the invention to provide a liquid and food holder unit which combines the functions of a drinking glass and a plate in a single structure, and dispenses with the need for a separate glass for liquid and a plate for canapés, for example, which items are difficult to handle, especially at a cocktail party where the guests may be standing, which unit is attractive in appearance and permits ready access to the base thereof which serves as a plate for the canapés or the like, yet may readily be handled for drinking without likelihood of dislodgment of the canapés, which unit is stable when positioned on a table and is not likely to tilt even when the receptacle portion thereof is filled with liquid and prevents dripping of liquid from the rim of the receptacle portion onto a table which might cause soiling or injury thereto, especially when the receptacle is filled with an alcoholic beverage.

According to the invention, these objects are accomplished by the arrangement and combination of elements hereinafter described and particularly recited in the claim.

In the accompanying drawings in which are shown one or more of various possible embodiments of the several features of the invention, Fig. 1 is a perspective view of the liquid and food holder unit, and Fig. 2 is a vertical sectional view taken along line 2—2 of Fig. 1.

Referring now to the drawings, the liquid and food holder unit which desirably is of glass, comprises a cup-shaped base 11 preferably circular as shown, having a thickened flat bottom or floor 12 with a side wall 13 rising therefrom, said wall desirably having a concave inner surface 14 defining an inturned upper edge 10.

The root end 15 of a stem 16 is rigidly affixed to the side wall 13 of the base 11 preferably being formed integral therewith and rises therefrom, said stem desirably being curved upwardly and inwardly with respect to the base 11 toward the center of the latter. The upper end 17 of the stem is sufficiently spaced from the base to provide ample clearance for ready removal of canapés or the like positioned thereon, and is substantially aligned with the center of the base 11.

The upper end 17 of the stem 16 desirably has a ridge 18 preferably formed integral therewith, said ridge lying in a plane substantially parallel to the floor 12 of the base 11. Mounted near the upper end 17 of the stem 16 above the ridge 18 and preferably formed integral with the stem is a liquid receptacle 19 which may be of any suitable shape and is illustratively frusto-conical having its smaller or bottom end directed downwardly and its mouth 21 directed upwardly.

Although the diameter of the mouth of the receptacle 19 may be of any suitable size, it preferably is of smaller diameter than the diameter of base 11 so that any liquid that drips from the rim of mouth 21 of the receptacle 19 when the unit is positioned on a table, will be caught by the base to prevent soiling or injury to the table on which it is placed.

With the construction above described, when the base 11 of the unit is positioned on a table and the receptacle 19 is filled with liquid, as the weight of the liquid is distributed directly over the center portion of the base, the unit will be stable and will not tilt, the thickened floor 12 of base 11 providing added stability by reason of its weight.

When canapés or the like are positioned on the base 11, by reason of the spacing between the floor 12 thereof and the ridge 18 where the unit is normally held for drinking, the hands of the user will not be soiled.

By reason of the cup-shaped conformation of the base, when the unit is tilted for drinking, although the canapés may slide along the base 11, they will be restrained from dislodgment therefrom by the side wall of the latter and such restraint is enhanced by the concave inner surface 14 of wall 13 as the canapés will abut against the inturned upper edge 10.

The liquid and food holder unit above described combines in a single structure the functions of a drinking glass and a plate. Thus, the need for a guest at a cocktail party to balance a glass in one hand and a plate in the other is eliminated. Consequently, there is little likelihood of spilling of liquid or dropping of the plate or the canapés thereon.

The receptacle portion 19 of the unit may be used if desired for sherbet, stewed fruit, ice cream or the like and cookies may be positioned on the base 11. Thus, a guest at a party where no table is utilized, may readily eat the contents of the receptacle without need for balancing a plate of cookies on one knee as is common.

As many changes could be made in the above construction, and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

A cup and saucer unit of the character described comprising a substantially saucer-shaped base having a side wall rising from the floor thereof, said side wall having a concave inner surface and terminating in an inturned flange, a stem rising from the outer surface of said side wall of said base, said stem being first curved outwardly from said upper edge and then curved inwardly and upwardly with respect thereto toward the center thereof, said stem being of sufficient length to define a handle, the upper end of said stem being spaced from said base and substantially aligned with the center thereof, said stem having a head of larger diameter than said stem near the upper end thereof and a beverage receptacle rising from the upper end of said head above said stem and having its mouth directed upwardly, the diameter of the mouth of said receptacle being less than the diameter of said base.

References Cited in the file of this patent

UNITED STATES PATENTS

| D. 64,660 | Domoto | May 20, 1924 |
| D. 91,229 | Pyle | Dec. 19, 1933 |
| D. 103,236 | Hufnagel | Feb. 16, 1937 |
| D. 155,299 | Laier | Sept. 20, 1949 |
| 248,867 | Lomax | Nov. 1, 1881 |
| 322,853 | Schlarbaum | July 21, 1885 |

(Other references on following page)

UNITED STATES PATENTS

| | | |
|---|---|---|
| 357,122 | Frey | Feb. 1, 1887 |
| 589,821 | Ebeling | Sept. 14, 1897 |
| 744,597 | Nicol et al. | Nov. 17, 1903 |
| 1,225,870 | Schwing | May 15, 1917 |
| 1,593,123 | Harr | July 20, 1926 |
| 1,761,299 | Heisey | June 3, 1930 |
| 1,893,628 | Marsden | Jan. 10, 1933 |
| 2,465,684 | Heintze | Mar. 29, 1949 |

FOREIGN PATENTS

| | | |
|---|---|---|
| 860,414 | France | Sept. 30, 1940 |